March 2, 1971 H. C. LEDEBUR 3,566,675
METHOD OF AND APPARATUS FOR PRESSURE TESTING HOLLOW BODIES
Filed Feb. 6, 1969 2 Sheets-Sheet 1
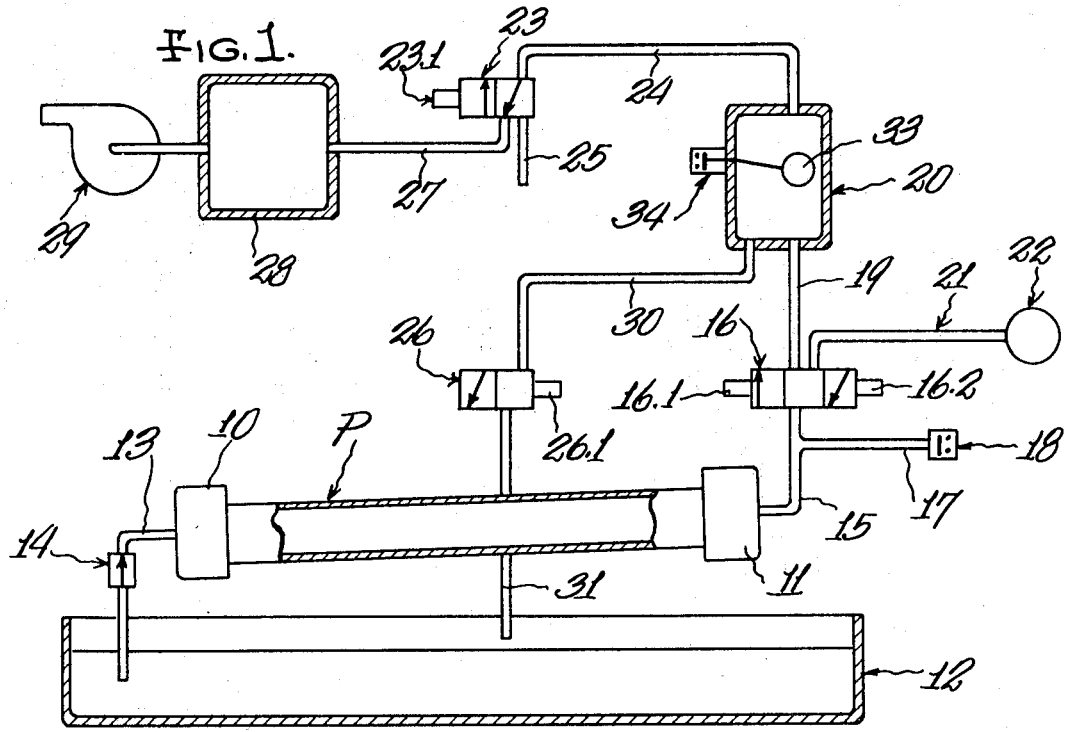
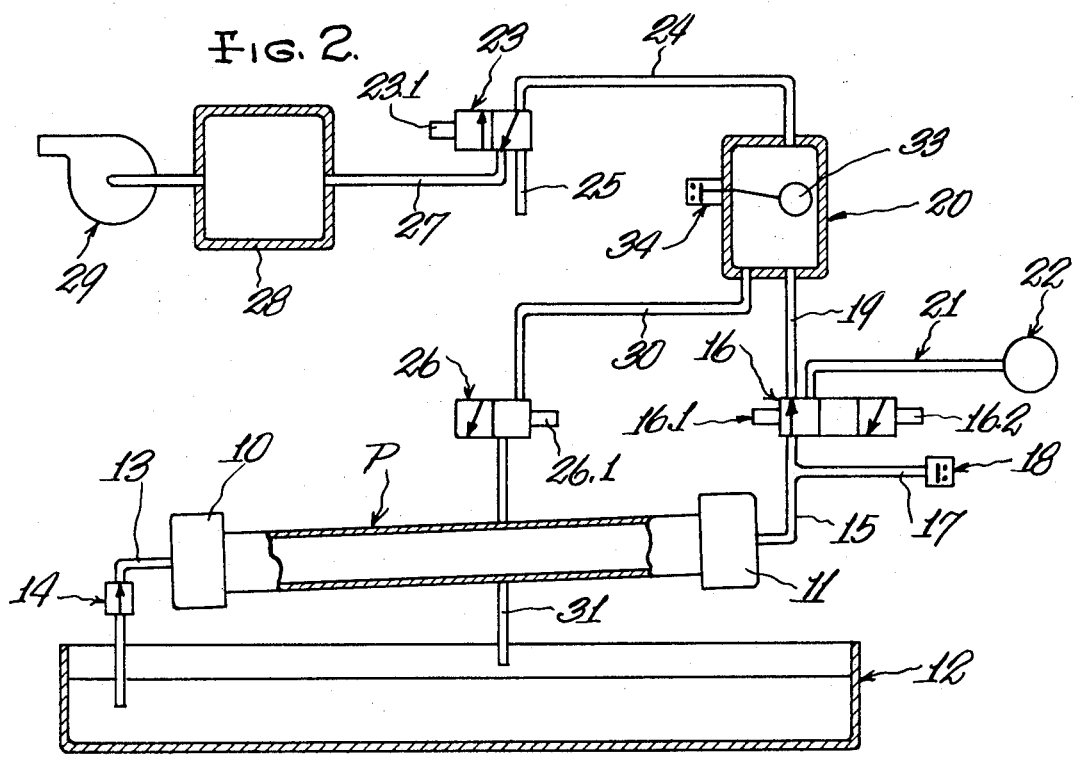
INVENTOR.
HARRY C. LEDEBUR
BY
Williams and Kreske
ATTORNEYS

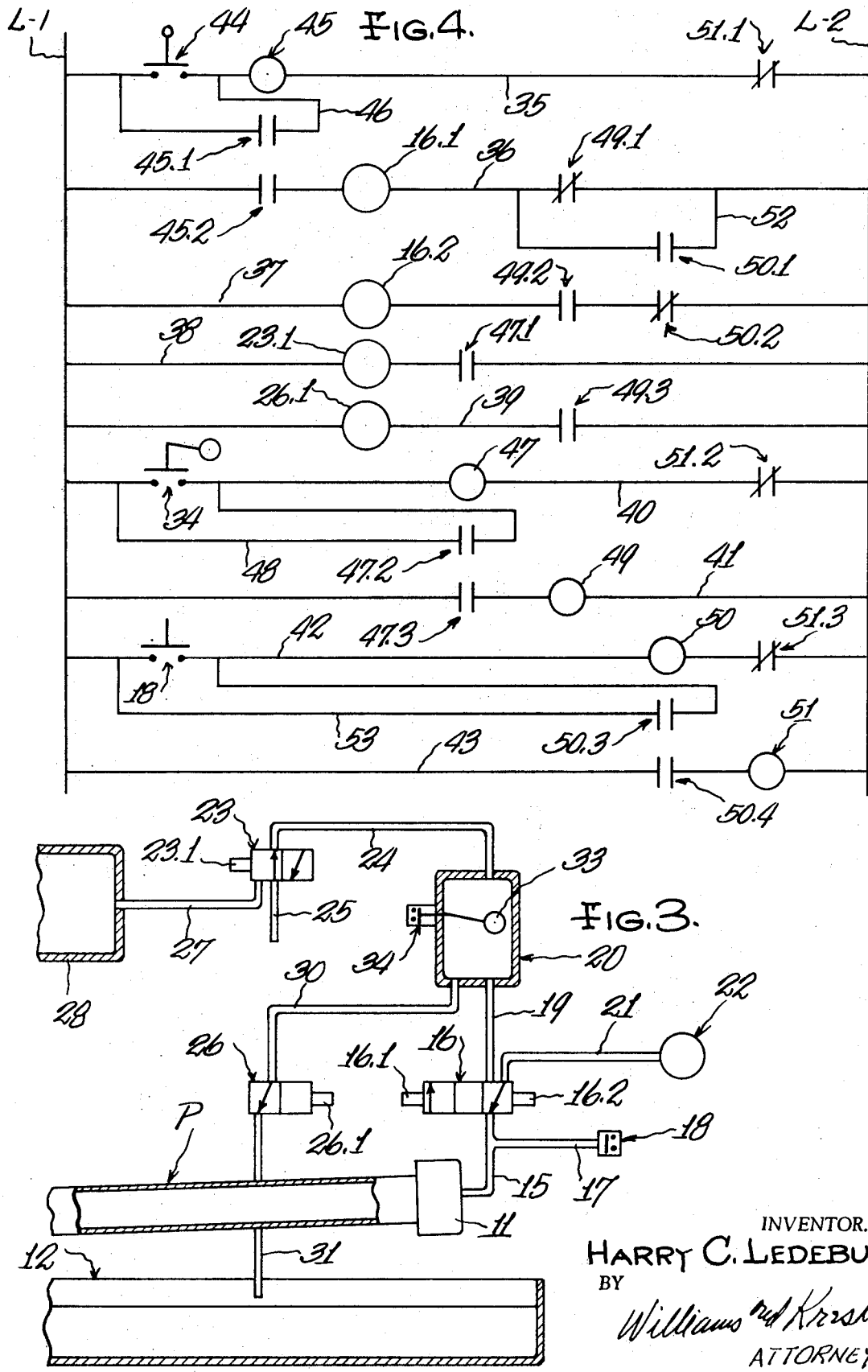

United States Patent Office 3,566,675
Patented Mar. 2, 1971

3,566,675
METHOD OF AND APPARATUS FOR PRESSURE TESTING HOLLOW BODIES
Harry C. Ledebur, Canfield, Ohio, assignor to Wean Industries, Inc., Youngstown, Ohio
Filed Feb. 6, 1969, Ser. No. 796,996
Int. Cl. G01m *3/64;* G01n *3/12*
U.S. Cl. 73—49.5                                   7 Claims

ABSTRACT OF THE DISCLOSURE

Method of and apparatus for testing a length of pipe by first filling the pipe with a test liquid by drawing the latter into the pipe by vacuum until a predetermined quantity of test liquid emerges from the pipe thereby assuring complete filling thereof, and introducing sufficient additional test liquid into the filled pipe from a high pressure source until the desired test pressure has been developed within the pipe.

BACKGROUND OF THE INVENTION AND SUMMARY

The testing of pipe by filling the same with a relatively incompressible fluid, such as water under high pressure, has long been practised. Heretofore, however, the apparatus employed for this purpose has been quite costly because the large volume of water required to fill the pipe to be tested necessitated the use of large pumps capable of rapidly moving the water volumes required. Even with the use of large pumps, however, testing time has been far too slow. Additionally, prior art apparatus and methods sometimes resulted in less than complete filling of the pipe before test pressure was developed therein and when an incompletely filled pipe ruptures under high test pressure, a virtual explosion can occur with obvious hazards.

In contrast, the present invention provides for filling of the pipe to be tested by vacuum and, the vacuum pumping equipment required is far smaller and simpler than comparable water pumping equipment heretofore required. Moreover, by allowing a relatively small but predetermined quantity of water to emerge into a surge tank from the pipe to be tested before pressurization of the pipe occurs, complete filling of the pipe is assured without the necessity of time-consuming delays which, for safety, are usually of greater duration than would otherwise be necessary.

These and other advantages of the present invention will readily become apparent from a study of the following description and from the appended drawings, and in these drawings:

DRAWING DESCRIPTION

FIG. 1 is a generally diagrammatic view of apparatus embodying the present invention, FIGS. 2 and 3 are views similar to FIG. 1 but showing certain parts in other positions at other portions of an operational cycle, and FIG. 4 schematically illustrates control circuitry for effecting the required operation of the apparatus seen in FIGS. 1, 2 and 3.

DETAILED DESCRIPTION

With reference to FIG. 1, P indicates a length of pipe to be tested while 10 and 11 are removable heads for closing respective pipe ends. Since the heads form no part of the present invention, they are not shown in detail and may be of any well-known design. In conventional apparatus, heads 10 and 11 are frequently mounted on respective carriages movable toward and away from each other whereby pipes of various lengths may be accommodated.

As herein illustrated, the pipe P to be tested is positioned above an elongated tank 12 containing a relatively incompressible test fluid such as water. An inlet conduit 13 extends from the head 10 to beneath the water level within the tank 12 and interposed in conduit 13 is a check valve 14 providing for flow of water in the direction from the tank to the head but preventing water flow in the opposite direction. Conduit 13, of course, communicates with the interior of the pipe P through the head 10.

Extending from the head 11 and communicating through the latter with the interior of pipe P is a conduit 15 which extends to a solenoid valve 16. A branch conduit 17 extends from conduit 15 and terminates in a pressure actuated switch 18 whose operation will later be described. Extending from solenoid valve 16 is a conduit 19 which terminates at the lower end of a surge tank 20 and also extending from the valve 16 is a conduit 21 leading to a pump 22 or other source of high pressure water.

Valve 16 has respective solenoid actuators 16.1, 16.2 and, in the position of parts shown in FIG. 1, with both valve actuators de-energized, conduits 15, 19 and 21 are out of communication. When, however, valve actuator 16.1 is energized, the valve operating parts will be shifted to establish communication between conduits 15, 19 as seen in FIG. 2. On the other hand, if actuator 16.2 is energized, the valve parts will be shifted to establish communication between conduits 15, 21 as seen in FIG. 3.

Extending from the upper end of surge tank 20 to a solenoid valve 23 is a conduit 24. A conduit 27 extends from valve 23 to a vacuum storage tank 28 in turn communicating with the inlet of a suitable vacuum pump 29. A conduit 25 extends from valve 23 to the atmosphere. Extending between the lower portion of surge tank 20 and a solenoid valve 26 is a conduit 30 and extending from such valve for discharge into the tank 12 is a conduit 31.

In the normal position of valve 23 as seen in FIG. 1, communication is established between the vacuum tank 28 and the surge tank 20 via the conduits 24, 27. When, however, the solenoid 23.1 of valve 23 is energized, the internal parts of such valve will be shifted to interrupt communication between the vacuum and surge tanks as seen in FIG. 3 and to vent the surge tank to the atmosphere through the conduit 25. Valve 26, in the normal position seen in FIGS. 1 and 2, blocks communication through the valve between the conduits 30 and 31. When, however, its solenoid 26.1 is energized, communication will be established through the valve between the conduits 30, 31 as seen in FIG. 3. Finally, disposed within the surge tank 20 is a float 33 so connected to a switch 34 that when water rises within the surge tank to a predetermined level, the contacts of normally open switch 34 will close.

To effect the desired operation of the apparatus thus far described is control circuitry illustrated in FIG. 4. As therein shown, circuits 35 through 43 extend across power lines L–1, and L–2. Interposed in circuit 35 is a momentary contact start switch 44 and the solenoid actuator of a relay 45, the latter having normally open contacts 45.1 and 45.2. Contacts 45.1 are interposed in a holding circuit 46 about the start switch 44 while the contacts 45.2 are interposed in the circuit 36 which also includes the solenoid actuator 16.1 of the valve 16.

Respectively interposed in the circuits 37, 38, 39 and 40 are the solenoid actuators 16.2 of valve 16, 23.1 of valve 23, 26.1 of valve 26, and the solenoid actuator of a relay 47 having normally open contacts 47.1, 47.2 and 47.3. Also interposed in the circuit 40 are the normally open contacts of the float switch 34. Relay contacts 47.1 are interposed in the circuit 38, 47.3 are interposed in the circuit 41 while the contacts 47.2 are interposed in a holding circuit 48 about the contacts of the float switch.

Respectively interposed in the circuits 41, 42 and 43 are the solenoid actuators of time delay relays 49, 50 and 51. Relay 49 has normally closed contacts 49.1 in circuit 36 which open a predetermined time delay after energization of the relay actuator. This relay also has normally open contacts 49.2 in circuit 37 and normally open contacts 49.3 in circuit 39 which close a predetermined time delay after energization of the relay actuator.

Relay 50 has normally open contacts 50.1, 50.3 and 50.4 which close a predetermined time delay after energization of the relay actuator and normally closed contacts 50.2 which open when the previously mentioned contacts close. Contacts 50.1 are in a holding circuit 52 about the contacts 49.1 of relay 49 while contacts 50.2 are in series with relay contacts 49.2 in circuit 37. Contacts 50.3 are interposed in a holding circuit 53 about the contacts of pressure switch 18 while contacts 50.4 are interposed in circuit 43 in series with the actuator or time delay relay 51. Relay 51 has normally closed contacts 51.1, 51.2 and 51.3 respectively interposed in circuits 35, 40 and 42, such contacts opening a predetermined time delay after energization of the relay actuator.

OPERATION

With the parts positioned as seen in FIGS. 1 and 4, all solenoid valves and relays are de-energized and the contacts of the float and pressure switches 34 and 18 respectively, are open. All communication through the valves 16 and 26 is blocked while valve 23 establishes communication between the conduits 24, 27. Accordingly, assuming that vacuum pump 29 is operating, vacuum tank 28 and surge tank 20 will be evacuated. The pipe P to be tested will be positioned as shown between the heads 10 and 11, with the latter closing respective pipe ends, and the start button 44 will be momentarily closed to initiate the testing cycle.

Momentary closing of the start switch 44 will energize the actuator of relay 45 and close its contacts 45.1 and 45.2. The closing of contacts 45.1 will retain the actuator energized after the start switch is released while the closing of contacts 45.2 will energize the solenoid actuator 16.1 of valve 16 thus shifting the latter from the closed position seen in FIG. 1 to the position of FIG. 2 wherein communication is established between conduits 15 and 19. With communication thus established, the pipe P will be evacuated thus drawing water from the tank 12 through the check valve 14 and into the pipe to fill the latter.

Filling of the pipe will continue until sufficient water is drawn into the surge tank 20 to actuate the float valve 34 and close its contacts in circuit 40. The closing of the float valve contacts will energize the actuator of relay 47 thus closing its contacts 47.1, 47.2 and 47.3. The closing of contacts 47.1 will energize the actuator 23.1 of valve 23 thus shifting such valve to the position of FIG. 3 wherein communication between the conduits 24, 27 is interrupted and wherein the surge tank is vented to the atmosphere via conduits 24, 25. Vacuum pump 29, however, will continue to operate to evacuate the vacuum tank 28 in preparation of another testing cycle. The closing of contact 47.2 activates a holding circuit about the contacts of float switch 34 while the closing of contacts 47.3 energizes the actuator of time delay relay 49.

After a predetermined time delay calculated to allow any turbulence within the pipe, caused by the rapid flow of water thereunto, to settle down and to allow any entrapped air to escape from the pipe and into the overlying surge tank, the contacts 49.1 of relay 49 will open and the contacts 49.2 and 49.3 will close. The opening of contacts 49.1 will de-energize the valve actuator 16.1 in circuit 36, the closing of contacts 49.2 in circuit 37 will energize valve actuator 16.2 and the closing of contacts 49.3 in circuit 39 will energize the solenoid actuator 26.1 of valve 26. With valve actuator 16.1 de-energized and valve actuator 16.2 energized, valve 16 will be shifted to the position seen in FIG. 3 wherein communication between conduits 15, 19 is interrupted and wherein communication is established between conduits 15, 21. With valve 16 thus positioned, high pressure water from the pump source 22 will be forced into the pipe P, it being noted that water cannot escape from the pipe because of operation of the check valve 14. At the same time, energization of solenoid actuator 26.1 will shift valve 26 from the position seen in FIG. 1 to the position seen in FIG. 3 to establish communication between conduits 30, 31 thus draining the surge tank 20.

When pressure within pipe P reaches a predetermined level, the contacts of pressure switch 18 will close thus energizing the actuator of time delay relay 50. After a time delay chosen to subject the pipe to the necessary test pressure for the required time interval, relay contacts 50.1 50.3 and 50.4 will close while contacts 50.2 will open. The closing of contacts 50.1 will energize valve actuator 16.1 and the opening of contacts 50.2 will de-energize valve actuator 16.2 thus shifting the valve 16 to the position of FIG. 2 again to relieve the pressure within the pipe. The previously mentioned closing of the contacts 50.3 will activate the holding circuit 53 about the contacts of pressure switch 18 while the closing of contacts 50.4 will energize the actuator of time delay relay 51.

After a time delay chosen to ensure substantially complete drainage of the surge tank 20, relay contacts 51.1, 51.2 and 51.3 will open thus returning all of the circuit components and parts to the positions seen in FIGS. 1 and 4 once again. The head 10, 11 may now be removed from the tested pipe P thus allowing the contained water to gravitate to the underlying tank 12 and such pipe will be removed and replaced by another pipe to be tested whereupon the operations hereinabove will be repeated.

While the foregoing disclosure has been directed to the pressure testing of pipe, it will readily be apparent that it is equally adaptable to pressure testing of other vessels. Moreover, while the invention has been described and claimed for use in pressure testing, it is contemplated that the invention may also be used for the pressure expansion of pipe or other vessels. During such pressure expansion, the pipe or other vessel may, if desired, be enclosed in a die which confines its expansion as required.

I claim:

1. Apparatus for pressurizing a length of pipe for testing and the like by first filling the latter with a relatively incompressible working fluid and then raising the pressure of the contained fluid to a desired pressure level, the improvement comprising:
    a first source of working fluid for connection to one end of the pipe to be pressurized for filling the same,
    a surge tank for connection to the opposite end of said pipe, said surge tank providing for escape of air from the pipe as the latter is filled with working fluid and such tank receiving a predetermined quantity of working fluid when said pipe has been filled,
    a second source of working fluid,
    and means responsive to a rising level of working fluid from said first source within said surge tank for isolating the latter from said pipe and for introducing working fluid from said second source into a said pipe until the desired pressure has been developed therein.

2. Apparatus for pressurizing a length of pipe for testing and the like by first filling the latter with a relatively incompressible working fluid and then raising the pressure of the contained fluid to a desired pressure level, the improvement comprising:
    a source of working fluid under atmospheric pressure in communication with one end of the pipe to be pressurized, a source of vacuum for connection to the opposite end of said pipe for drawing said working fluid into said pipe from said one end for filling purposes, a surge tank interposed between said source of vacuum and said opposite pipe end for receiving working fluid from said pipe when the latter becomes filled, a source of working fluid under greater than atmospheric pressure, valve means interposed between said surge tank and said pipe opposite end and between the latter and said greater than atmospheric pressure working fluid source, and means responsive to working fluid within said surge tank and operable when a predetermined quantity of working fluid has passed into said surge tank from said pipe to shift said valve means thus interrupting communication between said pipe opposite end and said surge tank.

3. The construction of claim 2 and further comprising a check valve intermediate said pipe one end and said first-mentioned source of working fluid, said valve providing for free flow of working fluid to said pipe from the source aforesaid while preventing flow of working fluid in a reverse direction.

4. The construction of claim 2 and further comprising additional valve means interposed between said surge tank and said source of vacuum for interrupting communication therebetween when said predetermined quantity of working fluid has passed into said surge tank from said pipe.

5. A method for pressure testing a length of pipe by filling the pipe with a relatively incompressible working fluid and raising the pressure of the said working fluid, the improvement which comprises:

introducing said working fluid from a first fluid source into the pipe while maintaining the pipe in communication with a suction source, continuing the introduction of said working fluid until a pipe is filled and a predetermined quantity of fluid emerges from the pipe toward said suction source, detecting said predetermined quantity of fluid between the pipe and said suction source, interrupting communication between said pipe and said suction source in response to detection of said fluid quantity, providing a time delay to settle turbulence in the working fluid and thereafter establishing communication between the pipe and a source of high pressure fluid, and subjecting said working fluid to said high pressure fluid until a desired testing pressure has been developed within the pipe.

6. The method of claim 5 including:
accumulating said predetermined quantity of said working fluid in a surge tank for detection thereof.

7. The method of claim 5 wherein said detecting step includes energizing an electrical circuit for establishing said time delay.

References Cited
UNITED STATES PATENTS

| | | | |
|---|---|---|---|
| 1,841,974 | 1/1932 | Naylor | 73—49.5X |
| 3,425,464 | 2/1969 | Hughes | 141—59X |
| 3,455,346 | 7/1969 | Stork | 141—42 |

LOUIS R. PRINCE, Primary Examiner

W. A. HENRY, Assistant Examiner

PO-1050
(5/69)

UNITED STATES PATENT OFFICE
CERTIFICATE OF CORRECTION

Patent No. 3,566,675            Dated    2 March 1971.

Inventor(s) Harry C. Ledebur

It is certified that error appears in the above-identified patent and that said Letters Patent are hereby corrected as shown below:

Column 2, line 70, after 23.1,"cf"should have read-----of--

Column 4, line 59, after "working,"-----fluid-----has been omitted.

Signed and sealed this 25th day of May 1971.

(SEAL)
Attest:

EDWARD M. FLETCHER, JR.          WILLIAM E. SCHUYLER,
Attesting Officer                   Commissioner of Patent